United States Patent [19]
Berger et al.

[11] Patent Number: 5,920,617
[45] Date of Patent: Jul. 6, 1999

[54] SENSOR SYSTEM WITH PT1 MEASURING DEVICE

[75] Inventors: Alexander Berger, Göppingen; Harald Ott, Sachsenheim, both of Germany

[73] Assignee: Daimler Benz AG, Germany

[21] Appl. No.: 08/917,502

[22] Filed: Aug. 26, 1997

[30] Foreign Application Priority Data

Aug. 26, 1996 [DE] Germany .............. 196 34 368

[51] Int. Cl.$^6$ .................................................. G01K 7/00
[52] U.S. Cl. ........................................ 379/169; 123/406.55
[58] Field of Search .................... 123/406.55, 488; 73/118.1; 374/144, 107, 169

[56] References Cited

U.S. PATENT DOCUMENTS

| | | | |
|---|---|---|---|
| 4,574,359 | 3/1986 | Ishizaka et al. | 364/557 |
| 4,836,442 | 6/1989 | Beckey | 236/46 R |
| 5,174,263 | 12/1992 | Meaney | 123/478 |
| 5,416,728 | 5/1995 | Rudzewicz et al. | 364/557 |
| 5,427,070 | 6/1995 | Thomas et al. | 123/488 |
| 5,544,639 | 8/1996 | Shouda et al. | 123/676 |
| 5,836,660 | 11/1998 | Brugger et al. | 303/155 |

FOREIGN PATENT DOCUMENTS

| | | |
|---|---|---|
| 34 10 292 A1 | of 1985 | Germany . |
| 195 21 530 A1 | of 1995 | Germany . |
| 58-76731 | of 1983 | Japan . |
| 59-203931 | of 1984 | Japan . |

OTHER PUBLICATIONS

Edmund Schiessle "Sensortechnik und Messwertaufnahme" Vogel 1992, pp. 29–31.

Yu. N. Naumov, S.V. Matsyk, and A.G. Popovich "Thermophysical Measurements—Corrector for Dynamic Error of Thermocouples", 2353 Measurement Techniques, vol. 20 No. 7, (Jul. 1977) pp. 1018–1020.

Dr. Paul Profos and Dr. h.c.Tilo Pfeifer, "Handbuch der industriellen Messtechnik", R. Oldenbourg Verlag Muenchen Wien 1992, pp. 68–80.

Primary Examiner—Willis R. Wolfe
Assistant Examiner—Arnold Castro
Attorney, Agent, or Firm—Evenson, McKeown, Edwards & Lenahan P.L.L.C.

[57] ABSTRACT

The invention provides a sensor system which has a measuring element which has a PT1-action, such as an engine oil temperature sensor for an internal-combustion engine of a motor vehicle. A measured-value analysis unit connected behind the measuring element adds to the measured values supplied by the measuring element a correction value equal to the product of the measuring element time constant and a sliding average change value of the successively sensed measured values.

6 Claims, 1 Drawing Sheet

SENSOR SYSTEM WITH PT1 MEASURING DEVICE

BACKGROUND AND SUMMARY OF THE INVENTION

This application claims the priority of German Application No. 196 34 368.2-52, filed Aug. 26, 1996, the disclosure of which is expressly incorporated by reference herein.

The invention relates to a sensor system having a measuring element which exhibits a PT1-action. This group of so-called measuring elements of the first order includes, for example, temperature measuring elements, optical measuring elements, magnetic-field measuring elements, piezoelectric, inductive and capacitive measuring elements. The time response of this type of measuring element can be described by a first order differential equation with a time constant $T_1$. See, for example, E. Schiessle, "Sensortechnik- und Meßwertaufnahme" ("Sensor Technology and Measured-Value Sensing"), Vogel Publishers, 1992.

It is a characteristic of these measuring elements that their response to abrupt changes of the quantity to be measured is delayed by the time constant $T_1$. As long as the value of the quantity to be measured changes linearly, a constant deviation remains between the measuring element output signal and the actual value of the sensed quantity; this difference corresponds to the product of the time constant $T_1$ and the rise of the linear change. In the case of a dynamically changing quantity to be measured, this delayed action of the measuring element will therefore necessarily result in measuring value deviations. The use of a sensor system having a measuring element with a faster response time (that is, one with a lower time constant), can frequently not be implemented in practice or is at least connected with relatively high expenditures. One example of such a dynamically changing quantity is the engine oil temperature of a motor vehicle internal-combustion engine during a driving operation. Since control interventions into the engine operation, such as a cylinder cut-off as a function of the engine oil temperature, occur frequently, there is demand for a dynamic engine oil temperature sensing which is as accurate as possible.

The object of the invention is therefore to provide a sensor system of the initially mentioned type which uses a low-expenditure measuring element, and also supplies a relatively precise output signal also for a dynamically changing quantity to be measured.

This and other objects and advantages are achieved by the sensor system according to the invention, in which a measured-value analyzing unit connected behind the measuring element adds to the measured values supplied by the measuring element a correction value equal to the product of the measuring-element time constant $(T_1)$ and a sliding average value of the successively sensed measured change values. When a measuring element with a given time constant is used, the measured value which is corrected in this manner reflects the actual value of the quantity to be measured substantially better than the uncorrected raw measured value, especially if the quantity changes dynamically. In particular, the corrected measured value follows fast changes of the quantity to be measured more rapidly than the uncorrected measured value in that an averaged correction value, which takes into account the delayed action of the measuring element, is added to the uncorrected measured value which may be smoothed by averaging.

In an advantageous embodiment, the sensor system according to the invention can be used for sensing the engine oil temperature for internal-combustion engine systems of motor vehicles in which, for example, an engine control unit controls a cylinder cut-off as a function of the measured engine oil temperature value supplied by the sensor system. Advantageously, the engine control unit simultaneously forms the measured-value analysis unit of the sensor system which may optionally be implemented as a hardware or software component in the engine control unit.

Other objects, advantages and novel features of the present invention will become apparent from the following detailed description of the invention when considered in conjunction with the accompanying drawings.

DETAILED DESCRIPTION OF THE DRAWINGS

Figure 1:
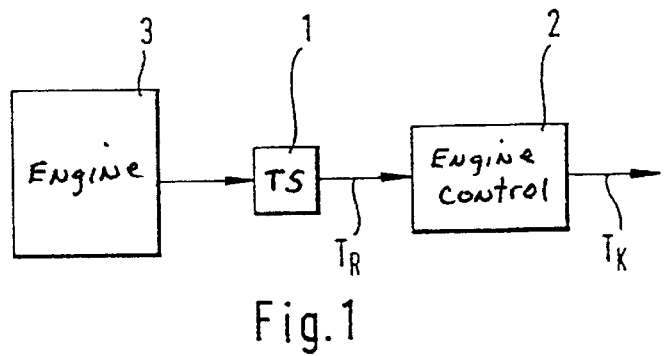
FIG. 1 is a schematic block diagram of a sensor system for sensing the engine oil temperature in an internal-combustion engine of a motor vehicle.

The sensor system illustrated in FIG. 1 contains an engine oil temperature sensor 1 as a measuring element, which exhibits a PT1-action, and a measured-value analysis unit in the form of an engine control unit 2 is connected to receive signals output by the temperature sensor 1. The engine control unit 2 controls a pertaining motor vehicle combustion engine 3 in a conventional manner, which is not part of the invention. For operating the engine control unit as a measured-value analysis unit for the engine oil temperature, corresponding software is implemented in it; or alternatively, the measured-value analysis unit 2 may be implemented as a hardware component which is integrated into the engine control unit or is separate.

Because of the PT1-action of the temperature sensor 1, the raw measured value $(T_R)$ which it supplies generally deviates relatively significantly from the true engine oil temperature $(T_W)$ during rapid time variations of the latter in dynamic engine operation; that is, its response to changes of the true oil temperature value $(T_W)$ is delayed by the characteristic time constant $(T_1)$. The engine control unit according to the invention takes this delay into account in its function as a measured-value analysis unit by adding a correction value (dT) to the raw measured temperature value $(T_R)$ to obtain the corrected measured oil temperature value $(T_K)$ used for the further engine control.

For this purpose, the engine control unit first reads several successive measured values $(T_R)$ from the temperature sensor 1, and then dampens this measured-value sequence by means of a sliding averaging in order to eliminate artifacts. For this purpose each new damped measured value is averaged with the ten preceding damped measured values. From two successive measured values damped in this manner, the associated incremental change value is then determined, and successively obtained change values are in turn damped by an identical sliding averaging. To determine the temperature correction value (dT), the engine control unit 2 forms the product of the damped rise value at the corresponding point in time and the fixed time constant $(T_1)$ of the temperature sensor 1. The raw measured value $(T_R)$ is then corrected by this correction value (dT); that is, the correction value (dT) is added to the damped measured value $(T_R)$ to obtain the oil temperature value $(T_K)$ from this sensor system. In this manner, the engine control unit 2, as the measured-value analysis unit, compensates the delay action of the temperature sensor 1 with the characteristic time constant ($T_1$) so that the temperature output value ($T_K$) of the sensor system 1, 2 more closely follows the true oil temperature value ($T_W$), especially in the case of dynamic fast changes of the latter, than the raw measured value ($T_R$) supplied by the temperature sensor 1.

Figure 2:
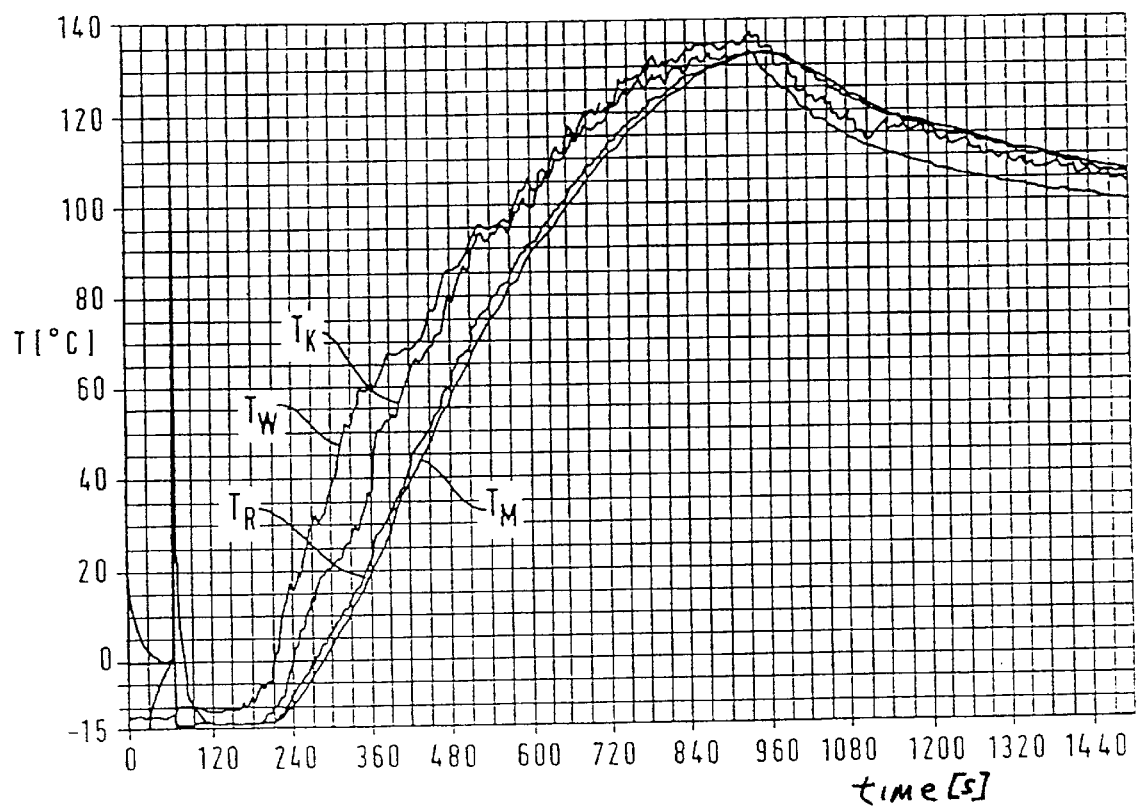
FIG. 2 is a graphic presentation of the engine oil temperature, for the example of an engine operating phase, for illustrating the function of the sensor system of FIG. 1.

FIG. 2 illustrates this fact for an engine operating from a cold start (t=0) at a temperature of −15° C. with a subsequent sharp warm-up. For this purpose, the diagram of FIG. 2 plots (as a function of time, in seconds) the true engine oil temperature value ($T_W$) pertaining to this operating phase, the raw measured oil temperature value ($T_R$) supplied by the oil temperature sensor, the measured oil temperature value ($T_M$) damped, as described above, by averaging, and the corrected measured oil temperature value ($T_K$) furnished at the sensor system output side. FIG. 2 shows that the corrected measured oil temperature value ($T_K$) follows the course of the true oil temperature value ($T_W$) during its sharp rise, and also during a later fading phase, significantly more rapidly than the raw measured oil temperature value ($T_R$). This dynamically more precise engine oil temperature sensing arrangement has, for example, advantages for internal-combustion engine systems in which the engine control unit 2 under corresponding conditions carries out a cylinder cut-off of the internal-combustion engine 3, to save fuel. Such cylinder cut-off can begin sooner after the start of the engine 3 because the corrected measured oil temperature value ($T_K$) follows the true oil temperature value ($T_W$) significantly more rapidly than the raw measured temperature value ($T_R$) supplied by the oil temperature sensor 1.

It should be noted that this more precise dynamic engine oil temperature sensing arrangement which is advantageous for the engine control does not require a higher-expenditure temperature sensor with a lower time constant. Rather, it utilizes a lower-cost suitable measured value analysis unit connected behind the sensor, which can be implemented as hardware or software. It is understood that sensor systems according to the invention can be used not only for the described case of an engine oil temperature sensing but can be used advantageously wherever a relatively precise dynamic sensing of a quantity to be measured is required by means of a relatively simple measuring element with a PT1-action.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A sensor system comprising:
a measuring element which generates an output comprising sequential measured values which are delayed by a measuring element time constant relative to actual values of a measured quantity; and
a measured value analysis unit connected to receive said measured values from said measuring element and to output corrected measured values for said measured quantity, by adding to said measured values a correction value equal to the product of said measuring element time constant and a sliding average change value of successively sensed measured values.

2. Sensor system according to claim 1, wherein the measuring element is an engine oil temperature sensor, and the measured value analysis unit comprises an engine control unit.

3. A method of providing corrected measurement values indicative of actual values of a measured quantity, comprising:
measuring said measured quantity by means of a measuring element which generates an output comprising measured values which are delayed by a measuring element time constant relative to actual values of said measured quantity;
generating said corrected measurement values by adding to said measured values a correction value equal to the product of said measuring element time constant and a sliding average change value of successively measured values.

4. A method of generating corrected measurement values indicative of actual values of a measured quantity, using a measuring element which generates an output comprising sequential measured values which are delayed by a measuring element time constant relative to said actual values, said method comprising:
measuring said quantity using said measuring element to generate a sequence of measured values;
for each measured value, determining a corresponding change value relative to a preceding measured value;
for each measured value, determining a corresponding sliding average change value equal to an average of the corresponding change value for such measured value and a plurality of preceding change values;
forming said corrected measurement values by adding to each measured value a correction value equal to the product of the measuring element time constant and the corresponding sliding average change value for said measured value.

5. The method according to claim 4, further comprising the step of:
damping said measured values by averaging each such measured value with a plurality of preceding measured values.

6. Apparatus for generating corrected measurement values indicative of actual values of a measure of quantity, using a measuring element which generates an output comprising sequential measured values which are delayed by a measuring element time constant relative to said actual values, said apparatus comprising:
a computer readable medium having stored therein a computer program comprising code elements for
reading measured values from said measuring element;
for each measured value, determining a corresponding change value relative to a preceding measured value;
for each measured value, determining a corresponding sliding average change value equal to an average of the corresponding change value for such measured value and a plurality of preceding change values;
forming said corrected measurement values by adding to each measured value a correction value equal to the product of the measuring element time constant and the corresponding sliding average change value for said measured value.

* * * * *